Figure 1:
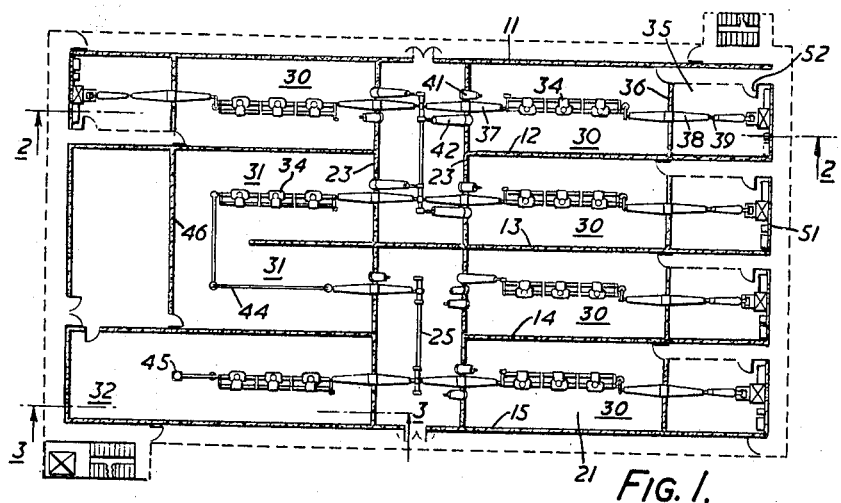

May 17, 1966 T. W. WILCOX 3,252,055
POLYPHASE ELECTRIC SWITCHGEAR ARRANGEMENT
Filed Sept. 24, 1962 3 Sheets-Sheet 1

INVENTOR
THOMAS W. WILCOX

BY
*Watson, Cole, Grindle & Watson*
ATTORNEYS

INVENTOR
THOMAS W. WILCOX
BY
Watson Cole, Grindle & Watson
ATTORNEYS

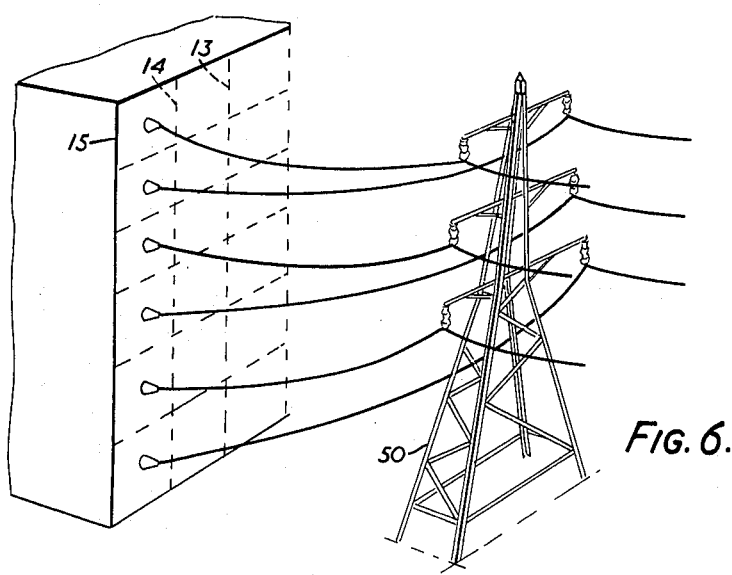
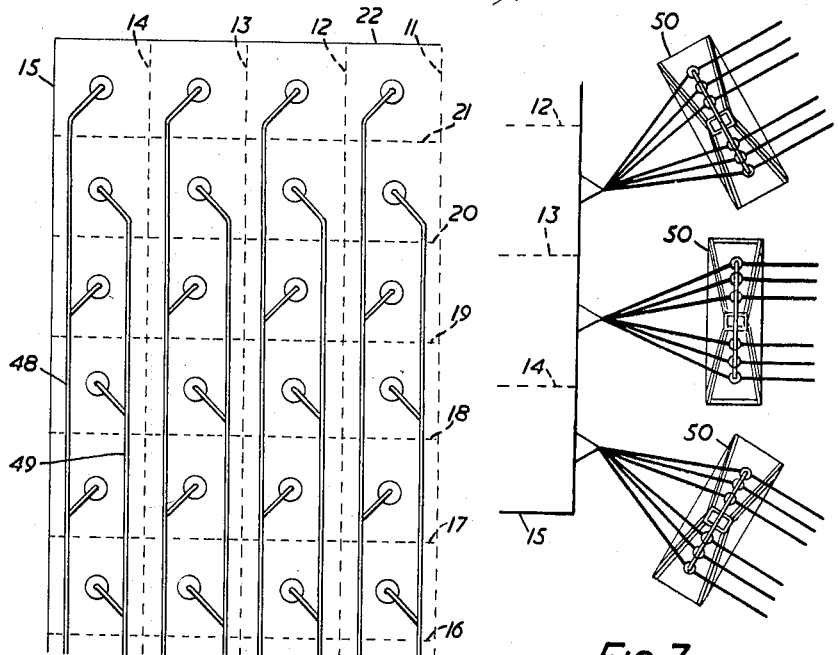

United States Patent Office 3,252,055
Patented May 17, 1966

3,252,055
POLYPHASE ELECTRIC SWITCHGEAR
ARRANGEMENT
Thomas Webster Wilcox, Whitley Bay, England, assignor to Merz and McLellan Services Limited, Newcastle-upon-Tyne, England, a company of Great Britain
Filed Sept. 24, 1962, Ser. No. 225,687
Claims priority, application Great Britain, Sept. 25, 1961, 34,290/61
7 Claims. (Cl. 317—103)

This invention relates to electric switchgear and an object of the invention is to provide an improved layout suitable for high voltages, for example 275 kv., which will provide an inexpensive and compact form of enclosed switchgear.

According to the present invention a polyphase switchgear system accommodated in spaces, which will be termed phase layers, separated from each other by a number of parallel planes, comprises a set of switchgear for each of a number of phases of each of a number of circuits, each set including a bus terminal of a busbar, a circuit terminal, a circuit breaker, an isolator for connecting the bus terminal to the circuit breaker and an isolator for connecting the circuit breaker to the circuit terminal, the switchgear sets of the same phase of different circuits being located in the same phase layer while those of different phases of the same circuit are located in different phase layers, and means for interconnecting pairs of adjacent circuit terminals of different circuits of each phase.

The means for interconnecting the circuit terminals of a pair of circuits may comprise a bare conductor, which must be applied when the circuits are dead, but preferably it includes an isolator. This may be of pivoted bushing type.

Conveniently the busbars extend parallel to one another in directions parallel to the planes separating the phase layers. Thus in one arrangement different sets of switchgear of different circuits of a phase are accommodated in spaces, which will be termed unit blocks, separated from other such blocks by a number of parallel planes perpendicular to those separating the phase layers. The planes separating the blocks may merely be imaginary geometrical planes but preferably the blocks are separated by partitions, each set of switchgear for each phase being mounted in a separate cell. In some cases the partitions may comprise solid walls, whilst in other cases some of them may be constituted by an earthed screen, for example of wire mesh.

An arrangement with the layers and busbars extending vertically may commend itself for certain requirements. In general, however, if the assembly includes many superposed blocks in each layer, it may be more attractive to turn the complete structure on its side so that each layer and each busbar extends horizontally, and an attendant can, if necessary, walk along the busbar passages for cleaning, maintenance or repair. Requirements as to the shape of the space to be occupied may indicate a preference for an arrangement with individual busbars running horizontally or vertically. Thus in a convenient arrangement the phase layers are separated by horizontal planes and the cells are of rectangular section separated by vertical and horizontal partitions.

Each set of switchgear may be arranged to extend generally along a line from its bus terminal to its circuit terminal in a direction parallel to the planes separating the phase layers and perpendicular to the busbars.

The two sets of switchgear of each phase may be connected to the same busbar, but alternatively a choice may be provided and the system may include two sets of busbars and means for connecting each set of switchgear alternatively to a busbar of either set. In this case each phase layer may be divided, or regarded as being divided, into two strata separated by a plane parallel to that separating the phase layers, each phase having two busbars, one in each stratum. Conveniently, sets of switchgear are also arranged in corresponding parts of the two strata of a phase layer, the sets associated with two circuits being located in different strata, and means is provided for connecting each set alternatively to the busbar in the same stratum and to the busbar in the companion stratum of the same phase layer.

Means may be provided for connecting together the circuit terminals of two sets of switchgear adjacent one another, one in each of the two strata of a phase layer. Alternatively or in addition, means may be provided for connecting together the circuit terminals of two adjacent sets of switchgear spaced from one another in a direction parallel to the planes separating the phase layers.

Each busbar may be arranged to extend between two groups of sets of switchgear placed back to back.

Such an arrangement enables each bus conductor to be connected to any one or more of four sets of switchgear. Indeed, the bus conductors could aptly be termed bus points since in each case the four sets of switchgear can be connected to quite a short length of the conductor.

Certain cells may be devoted to bus coupler equipment or bus section equipment. Thus a pair of adjacent cells, one in each of the two strata of a phase layer, may cooperate to house a bus coupler equipment. Similarly a pair of adjacent cells in the same layer or stratum, and spaced from one another in a direction parallel to the planes separating the phase layers, may cooperate to house a bus section equipment.

It will be appreciated that in the structure described the whole of the switchgear associated with one phase is completely segregated from that associated with other phases. For example, an assembly might comprise six horizontal strata or stories of which the top two strata are associated with one phase, the middle two strata with another phase and the lower two strata with a third phase. Of each pair of strata the upper one is associated with a main busbar and the lower one with a reserve busbar or vice versa. The two cells of a pair of strata of a given vertical slab may then house switchgear associated with corresponding phases of two separate circuit outlets, the other two pairs of strata of the same slab housing switchgear for the other two phases of the same pair of circuit outlets. This layout renders it an extremely simple matter to interconnect the circuit terminals of one phase of two different circuits without the necessity for a conductor of that phase to cross over or pass close to conductors of other phases, and therefore lends itself particularly advantageously to the highest voltages.

The pairing of circuits so that outlet terminals of adjacent circuits can be connected together to make use of the same circuit breaker affords a very high degree of versatility and economy. In order to work on a circuit breaker for maintenance or repair it is only necessary to connect its circuit terminal to a neighbouring circuit terminal and isolate it by opening the isolators between it and its circuit terminal and between it and its busbar.

Figure 2:
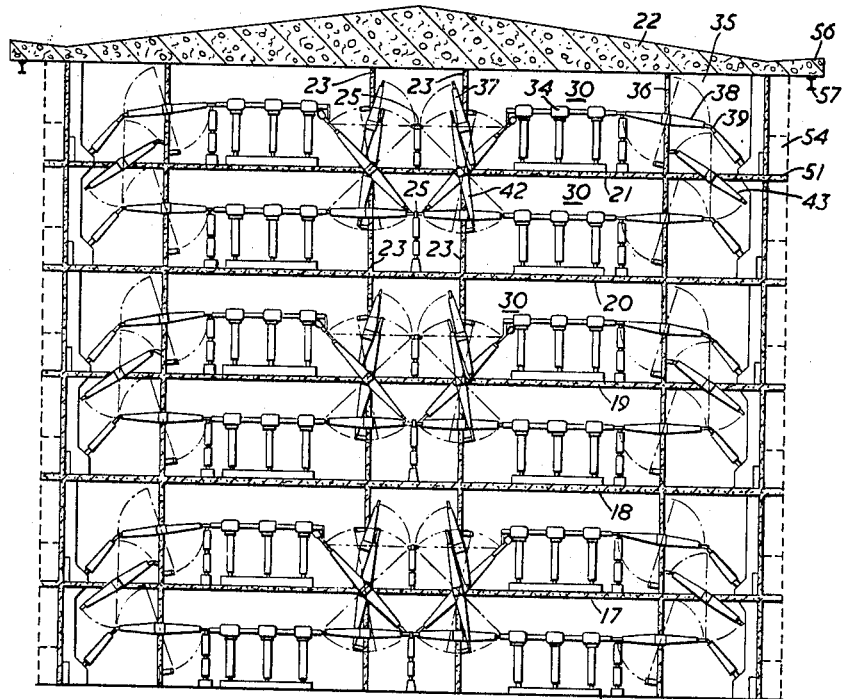
Figure 3:
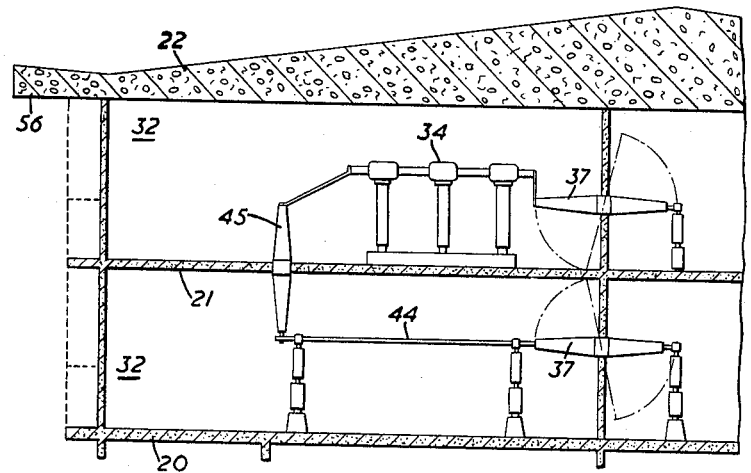
Figure 4:
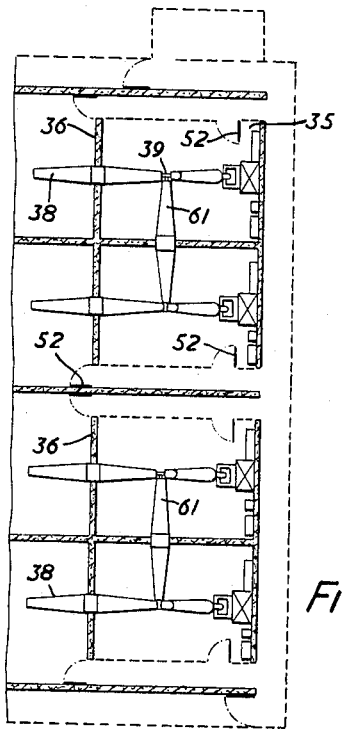

The invention may be performed in various ways but one specific embodiment and certain modifications will be described by way of example wth reference to the accompanying drawings in which:

FIGURE 1 is a plan view of a switching station for a 275 kv. system with the roof removed, FIGURE 2 is a sectional elevation generally on the line 2—2 of FIGURE 1, FIGURE 3 is a fragmentary section generally on the line 3—3 of FIGURE 1, showing a bus coupler equipment accommodated in two cells one above the other, FIGURE 4 is a fragmentary plan view similar to part of FIGURE 1 showing circuit terminals connected by horizontal isolators, FIGURE 5 is a diagrammatic end elevation of part of the station indicating the lines of out-going cables, FIGURE 6 is a diagrammatic perspective view indicating the lines of out-going overheat conductors of a pair of circuits to a pylon, and FIGURE 7 is a diagrammatic plan view indicating the lines of out-going conductors of three pairs of circuits radiating to these pylons.

The station is housed in a building which is divided into a number of elongated cells of rectangular section by vertical and horizontal partitions. In this particular structure there are five vertical partitions 11 to 15 including the outer walls, and seven horizontal partitions 16 to 22 including the floor and roof. Two of the vertical partitions 12 and 14 are interrupted in the middle and walls 23 are provided to form busbar passageways extending horizontally at right angles to the length of the cells. Thus each busbar section passageway contains a busbar section 25 and extends past the ends of four cells, each nearly half the length of the building, there being forty-eight cells in all.

Each of thirty of the cells 30 contains a set of switchgear for one phase of one circuit outlet, whilst six pairs of cells 31 contain switchgear for two sets of bus section equipments, and three pairs of cells 32 contain switchgear for one set of bus coupler equipment.

The circuit outlet cells 30 are arranged in pairs so that, for example, the three phases of a given circuit outlet might occupy the second, fourth and sixth horizontal strata or stories in a vertical slab, whilst those of the companion circuit outlet would occupy the first, third and fifth stories of the same slab. Corresponding phases of a main busbar would occupy the second, fourth and sixth stories whilst corresponding phases of a reserve busbar would occupy the first, third and fifth stories of all slabs.

Each of the cells 30 associated with one phase of a circuit contains an appropriate circuit-breaker 34 mounted in its central portion which is divided from the busbar passage at one end by one end wall 23 and from a circuit outlet compartment 35 at the other end, by another end wall 36. Each of these end walls has in it a pivoted bushing isolator. The isolator 37 at one end serves to connect the switchgear to the associated busbar whilst that 38 at the other end serves to connect the circuit-breaker to a circuit terminal 39 mounted on a suitable insulator in the circuit terminal compartment 35.

In addition to the pivoted bushing isolators in the end walls there are also two further pivoted isolators 41 and 42 diagonally mounted at the intersection of the wall 23 of the busbar passage with the floor (17, 19 or 21) separating corresponding phases of a pair of circuit outlets. One of these isolators 41 enables the upper circuit-breaker of a pair to be connected to the lower busbar and the other 42 enables the lower circuit-breaker to be connected to the upper busbar.

There are also pivoted bushing isolators 43 in the floors 17, 19 and 21 separating circuit terminal compartments 35 accommodating corresponding phases of a pair of circuit outlets. Thus there is a pivoted bushing isolator mounted in each of the floors 21, 19 and 17 between the first and second, third and fourth, and fifth and sixth circuit terminal compartments which can connect together the corresponding circuit terminals 39 of each phase of two outgoing circuits.

As already indicated, certain of the cells 32, for example those of one outermost slab of one half of the building, are devoted to bus coupler equipments, that is to say they house switchgear enabling the upper busbar and the lower busbar of a pair to be connected together. As shown in FIGURE 3 each bus coupler equipment occupies two cells 32 one above the other. One cell contains a circuit-breaker 34 similar to that of a cell devoted to a circuit outlet whilst the other cell of the pair merely contains a straight-through conductor 44. The circuit-breaker is connected to the associated busbar by a rocking bushing isolator 37 and the conductor is similarly connected to its busbar. The end of the circuit-breaker remote from the busbar is connected to the corresponding end of the conductor through a vertical bushing insulator 45 passing through the intervening floor. Alternatively the intervening floor may be omitted and the connection taken direct. The bus coupling units are somewhat shorter than the circuit outlet units and if desired the space left vacant may be occupied by stairs or a lift giving access to various floors.

In the particular arrangement shown the upper busbar of each pair, i.e. that in the upper stratum of each phase layer, is divided into two sections which can be connected together by a bus section equipment. This occupies the middle two cells 31 of the upper stratum of each phase layer in one half of the building. As shown in FIGURE 1, one cell contains a circuit-breaker 34 whilst the other contains a straight through conductor 44. Each section equipment is precisely analogous to the corresponding bus coupler equipment except that it occupies a pair of neighboring cells side by side in the same story and the connection 44 passes horizontally through the partition wall between them instead of vertically through the floor.

In the lower stratum of each phase layer, the arrangement may be the same as in the upper stratum, as shown in FIGURE 1, or the busbar may be in two sections connected by an isolator, or the busbar may be in a single continuous length.

Whilst the totally enclosed switchgear may be associated with underground cables the arrangement described can none-the-less be employed in conjunction with one or more overhead lines or even a complete system of overhead lines.

Where underground cables are employed the arrangement described lends itself to a compact and convenient grouping of cables, as shown diagrammatically in FIGURE 5, the three phases 48 of one circuit outlet of a pair extending down to one side of the circuit terminal say to the left when facing the busbars, whilst those 49 from the companion outlet extend down the other side, say to the right.

Where an outlet is to be connected to an overhead line the conductors from the three circuit terminal compartments may be led directly to the three insulators, one above the other, of a suitable pylon 50. On a 275 kv. system each cell might be of the order of 23 ft. high by 20 ft. wide so that the spacing would be suitable for direct connection to the insulators of a pylon. Where a pair of circuit outlets are to be connected to an overhead line, conductors may extend direct from all six circuit terminal compartments, as indicated in FIGURE 6. Where overhead lines are connected to two or more slabs the conductors may radiate out to a corresponding number of pylons as indicated in FIGURE 7.

Walk-ways 51 are preferably provided by extending the floors beyond the ends of the circuit terminal compartments to give access to the various cells through suitable doors 52. If overhead lines are employed the walk-ways may be enclosed in wire cages 54, since the spacing of 23 ft. referred to would allow a cage 9 ft. high whilst still providing 7 ft. clearance above and below the conductor. Hoverer, preferably the roof 22 is extended beyond the walk-ways as shown at 56 and provided with rails 57 to support hoists for raising and lowering the equipment.

The arrangement described provides an extremely versatile, compact and inexpensive switching station. Since the whole of the switchgear is under cover it enjoys the well known advantages of being free from trouble due to atmospheric pollution. Moreover, unlike certain known designs, which cannot have any windows if air-blast circuit-breakers are employed, it gives freedom to the architect in that windows may be provided at the ends of the busbar passages and at any point round the circuit outlet compartments.

A specific layout of switchgear having forty-eight cells has been described by way of example but it will be appreciated that one of the advantages of the invention is that it lends itself to a very great variety of different layouts.

Moreover, it will be appreciated that a building built for one layout may be extended without difficulty by adding further vertical slabs and extending the lengths of the busbar passages and busbars in accordance with requirements. Alternatively, if certain cells are initially left vacant it is a simple matter to install equipment in them as and when required.

FIGURES 1 and 2 show pivoted bushing isolators 43 for connecting together two circuit outlet terminals one above the other, in different strata of the same phase layer. Alternatively or in addition, as shown in the fragmentary diagram of FIGURE 4, horizontal rocking bushing isolators 61 may be provided for connecting together adjacent circuit outlet terminals in the same stratum.

In this way a circuit terminal may be capable of being connected to any of one two or even three neighbours. Hence if a circuit-breaker requires maintenance or repair its circuit terminal can be connected to a neighbour, and it can be isolated by opening the appropriate isolators 37 and 38.

The pairing of feeders so that corresponding phases of a pair may be connected together to make use of the same circuit-breaker affords a very high degree of versatility and economy. Thus, at the cost of a single pivoted bushing isolator for each pair of feeder phases, every circuit outlet has a choice of two circuit-breakers, giving a very high proportion of standby circuit-breaker capacity at very modest cost. The protective gear for the circuit outlet can remain undisturbed provided that the tripping impulse is changed over to the operative circuit-breaker. The breaking capacity required for two feeders will generally be no greater than that required for one feeder, and in general the current carrying capacity of a normal circuit-breaker of the required breaking capacity will be sufficient for two circuit outlets. Thus the expense and complication of providing bypass isolators for the circuit-breakers is eliminated, and if a circuit-breaker requires repair or maintenance it is only necessary to connect the associated feeder to the companion circuit-breaker and isolate the faulty circuit-breaker until the fault has been rectified. The layout of the switchgear, with the phases segregated in separate phase layers each divided into two strata, enables this interconnection to be carried out without any crossing over of conductors of different phases, and hence lends itself to systems at the highest voltages.

The arrangement described also provides a very high degree of flexibility of busbar connection in that it enables a point of a busbar to be connected to any one or more of four circuit-breakers by equipment confined within a relatively small space, namely two straight-through isolators to circuit-breakers level with it, and two diagonal isolators to circuit-breakers above or below it.

The invention has been described as having each cell paired off with only one of its neighbours but it will be realizing that the designer has a choice of cells with which he can pair any cell and indeed it can if desired be paired with two or three other cells at the same time by providing additional isolators. Thus for example a cell in a lower horizontal stratum of a pair can be paired with the cell above or the cell to either side, giving three choices. Moreover a cell may be paired with one or more neighbours as regards parallel connection of feeder phases, and a different neighbour or neighbours as regards connection to busbars or busbar sections.

The layout described is not of course confined to any particular types of components such as circuit breakers isolators and the like, but can be employed with various known types of such equipment, which it is thought unnecessary to describe. In particular although a rocking bushing type of isolator has substantial advantages, at least some of the isolators could be of rotating post type mounted close alongside a large opening in a partition, which can be closed by a folding door when the isolator is in the open position.

What I claim as my invention and desire to secure by Letters Patent is:

1. A polyphase switchgear system accommodated in spaces, which will be termed phase layers, separated from each other by a number of parallel planes, and each associated with one of a number of phases, comprising:
   at least one busbar for each phase lying in the associated phase layer, the said busbars extending parallel to one another in directions parallel to the planes separating the phase layers,
   a set of switchgear for each phase of each of a number of circuits, each set including a bus terminal of a busbar, a circuit terminal, a circuit breaker, an isolator for connecting the bus terminal to the circuit breaker and an isolator for connecting the circuit breaker to the circuit terminal,
   the switchgear sets of the same phase of different circuits being located in the same phase layer while those of different phases of the same circuit are located in different phase layers,
   two sets of said switchgear coupling said busbar to two different circuits at two respective circuit terminals and an isolator for selectively connecting together the two circuit terminals of each of the two said sets to permit isolation of one circuit breaker while maintaining connections to said two circuit terminals through the other circuit breaker of said two sets of switchgear.

2. A polyphase switchgear system accommodated in spaces, which will be termed phase layers, separated from each other by a number of parallel planes, and each associated with one of a number of phases, comprising:
   two busbars for each phase lying in the associated phase layer,
   a plurality of sets of switchgear for each phase leading to each of a number of circuits, each set including a bus terminal of each busbar, a circuit terminal, a circuit breaker, two isolators respectively for connecting the circuit breaker to either bus terminal and an isolator for connecting the circuit breaker to the circuit terminal,
   the switchgear sets of the same phase of different circuit being located in the same phase layer while those of different phases of the same circuit are located in different phase layers,
   two of said plurality of sets of switchgear leading to two corresponding circuit terminals, and an isolator for selectively connecting together said two corresponding circuit terminals to permit isolation of one circuit breaker of said two sets while maintaining connections to both circuit terminals through the other circuit breaker of said two sets.

3. A system as claimed in claim 2 in which each phase layer is divided into two strata separated by a plane parallel to those separating the phase layers, and each phase has two busbars, one in each stratum, both lying in a plane perpendicular to said planes.

4. A system as claimed in claim 3 in which at least part of said sets of switchgear are also arranged in rows extending parallel to the busbars in corresponding parts of the two strata of a phase layer, the sets associated with two of said circuits being located in different strata, and means is provided for connecting each set alternatively to either of the two said busbars.

5. A system as claimed in claim 4 having means for connecting together the circuit terminals of two sets of switchgear adjacent one another one in each of the two strata of a phase layer.

6. A system as claimed in claim 4 having means for connecting together the circuit terminals of two adjacent sets of switchgear spaced from one another in a direction parallel to the planes separating the phase layers.

7. A system as claimed in claim 1 in which each bus-bar extends between two groups of sets of switchgear placed back to back.

References Cited by the Examiner

UNITED STATES PATENTS

| | | | |
|---|---|---|---|
| 899,358 | 9/1908 | Valkenburg | 317—103 |
| 1,454,744 | 5/1923 | Jamieson | 317—103 |
| 1,502,442 | 7/1924 | Rossman et al. | 317—103 |

FOREIGN PATENTS 759,739  10/1956  Great Britain.

ROBERT K. SCHAEFER, *Primary Examiner.*

JOHN F. BURNS, KATHLEEN H. CLAFFY,
*Examiners.*

J. G. COBB, W. C. GARVERT, *Assistant Examiners.*